Feb. 27, 1934.  F. L. FOSTER  1,948,706
RADIATOR MOUNTING
Filed Nov. 28, 1930
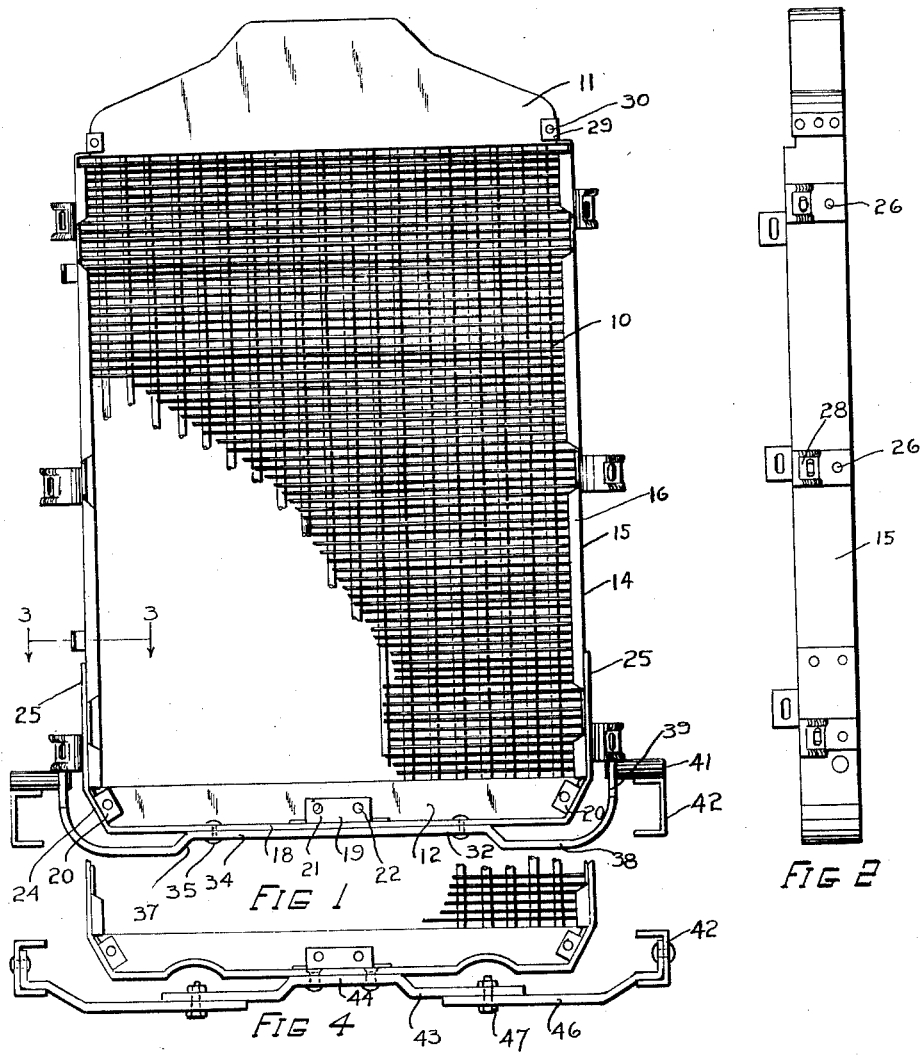
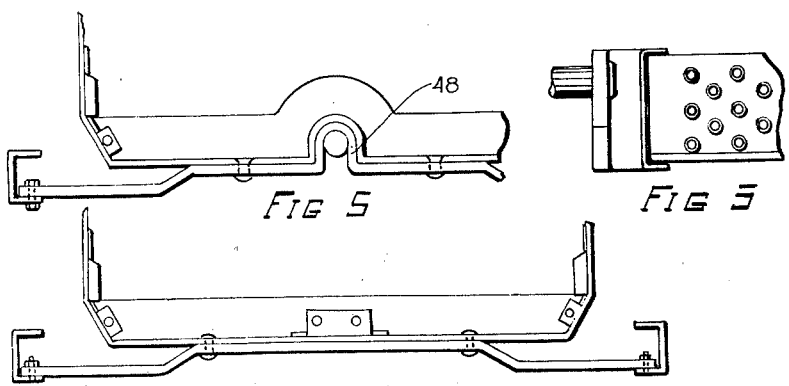
Inventor
FRED L. FOSTER
By Richmond S. Hayes
His Attorney Patented Feb. 27, 1934

1,948,706

UNITED STATES PATENT OFFICE 1,948,706

RADIATOR MOUNTING

Fred L. Foster, Jamestown, N. Y., assignor to Jamestown Metal Equipment Company, Inc., Jamestown, N. Y., a corporation of New York Application November 28, 1930
Serial No. 498,542

4 Claims. (Cl. 180—68)

This invention relates to an improved mounting for automobile radiators.

Prior to this invention the usual method employed in supporting a radiator on an automobile chassis was to provide a cross member having upwardly projected flanges engaged directly or through upright arms with the sides of the radiator core. The bottom of the member was spaced from the lower tank of the radiator and engaged directly upon the cross bar of the chassis. The purpose of this structure was to reduce the vibrations received by the radiator when the automobile was in operation and constituted a considerable improvement over the old method of securing the lower tank of a radiator directly to the cross bar of the chassis.

The present trend in automobile construction and use requires that virtually no vibration be transmitted to the radiator through the chassis when the automobile is in operation. To accomplish this and to prevent the twisting or racking of a radiator between supporting points, the present invention provides a structure which engages a radiator supporting frame substantially centrally of the base of the radiator. Connection with the chassis rails is had through spring plates which receive and absorb the major vibrations set up when an automobile is in operation. Should the automobile be subjected to such use as to cause vibrations to reach the radiator, said radiator will be capable of movement both laterally and lengthwise of the automobile within certain limits about the central suspension point. Since the radiator, as a whole, is free to move horizontally in any direction about the central support, there can be no twisting or distorting of any kind.

The principal object of the invention therefore lies in the provision of a central cradle-like suspension for automobile radiators.

Another object of the invention includes the attachment of the radiator supporting means directly to the rails of the chassis rather than to the chassis cross bar.

A further object of the invention is to provide a structure which is adaptable for use with all types of radiators, including the later type wherein the lower water tank projects beneath the horizontal line of the chassis.

A still further object of the invention is to provide full length engagement of the radiator core with a supporting frame.

Other and further objects of the invention will be apparent from a consideration of the following specification which is taken in conjunction with the accompanying drawing, and in which Fig. 1 is a front elevation of a radiator core showing one modification of a means by which to support said core on a chassis;

Fig. 2 is a side elevation of the structure in Figure 1 and shows the method of attaching a supporting frame to the radiator core;

Fig. 3 is an enlarged fragmentary sectional view taken substantially on the line 3—3 of Figure 1, showing further details of the device; and Figs. 4, 5 and 6 disclose further modifications of the structure shown in Figure 1.

Referring to the drawing the reference numeral 10 is employed to designate a radiator core which is closed top and bottom by tanks 11 and 12. Enclosing the vertical edges of the core 10 and the bottom tank 12 is a frame 14. The frame is comprised of channel elements 15, the flanges 16 of which engage the front and rear edges of the core, and a bottom element 18 which, by means of the clips 19 and 20, engages the tank 12. The clip 19, located centrally of the bottom element, is formed with flanges 21 engaging the front and rear edges of the tank 12. Openings 22 are made in the clip and, when the core is mounted in the frame 14, are filled with solder to prevent any shifting of the tank relative to the element 18. In the present embodiment the element 18 is formed with angular portions 24, which, following the contour of the radiator, terminate in vertical flanges 25. The flanges 25 overlap the channel elements 15, being joined thereto in any suitable manner as by welding.

When the frame 14, comprised of the elements 15 and 18, is assembled, the core 10 is mounted therein. Attention is directed to the fact that, at intervals in the channel elements 15, openings 26 are provided, being adapted to serve the dual purpose of centering the radiator shell supporting clips 28 and permitting pouring solder into the space between the vertical edges of the core and the channel elements whereby to join the core and frame. The walls of the openings 26 are flanged so as to properly locate the clips 28 relative to the frame 14. The clips 28 are welded to the channel elements prior to mounting the core 10. The elements 15 terminate at their upper ends in clips 29 which are bent inwardly, substantially as shown, to engage the upper tank 11. Solder engages this tank through openings 30 in the clips 29.

The element 18 of the frame 14 is mounted on a cradle-like suspension 32. This suspension is formed with a central raised portion 34 with which the element 18 is engaged in any suitable manner as by rivets 35. The portion 34 terminates in downwardly projected flanges 37. The suspension, beyond the flanges 37, continues in horizontal portions 38, spaced from the element 18 of the frame, which terminate in vertical flanges 39. Mounted in the flanges 39 are outwardly projecting pins 41. These pins are supported on the rails 42 of the chassis, being joined thereto in any suitable manner.

The suspension 32, being engaged only centrally by the element 18 of the frame 14, permits a certain amount of relative movement between the core 10 and the chassis rails 42. It is contemplated to vary the thickness of the portions 38 and flanges 39 by which to increase or decrease the rigidity of the core and frame relative to the suspension.

The modification of Figure 4 provides a more centered support of the frame 14 through the use of a suspension 43. This suspension has a centrally raised portion 44 suitably joined to the element 18 of the frame. This structure has some advantages over that of the above described in that the suspension to be mounted on the chassis rails 42 is provided with arms 46, being joined thereto by bolts 47. With this structure, the arms 46 can be attached to the rails 42, the suspension 43 to the frame 14, and, at any suitable time in the assembly of the car, the radiator bolted to the arms 46.

Certain automobile construction necessitates the provision of an engine crank opening in the lower tank of the radiator. Heretofore a tube has been soldered in the tank to provide this opening which, under slight strain of the crank, has loosened, causing leakage of the radiator. The present invention in the modification in Figure 5 shows the suspension bent to follow the contour of the necessary tank opening. In this structure the suspension is required to take the strain of the crank rather than the lower water tank which, as may be seen, is protected by the U-shaped portion 48 of the suspension. In Figure 6 as in Figure 5, the suspension is centrally connected with the frame 14 within which the core 10 is mounted, thus assuring a cradle-like support of the core relative to the chassis.

While applicant has disclosed several modifications of a substantially central cradle-like suspension for radiator cores, it is contemplated that other modifications may be made to meet requirements of various automotive manufacturers and it is intended therefore that this invention be limited in spirit and scope only as defined in the hereunto annexed claims.

Having thus set forth my invention what I claim as new and for which I desire protection by Letters Patent is:—

1. In a radiator for motor vehicles, a core, channel elements forming part of a core supporting frame, said elements enclosing the vertical edges of said core, flanges defining annular openings in said elements, shell supporting clips, walls defining annular openings in said clips, said clips being mounted on said elements, said element flanges registering with said clip openings and adapted to prevent removal of said clips.

2. In a radiator for motor vehicles, a core, a frame engaging the vertical edges of said core, flanges defining a plurality of annular openings in said frame, shell supporting clips, walls defining openings in said clips, said frame flanges centering and securing said clips to said frame by registering with said clip openings, said frame and clip openings giving access to the space between said core and said frame whereby solder may be admitted at several points to produce a continuous joint between said frame and said core.

3. In a radiator structure, radiator core supporting means comprising channel elements, said elements being permanently joined throughout their length to the vertical edges of a core, a bottom element connecting said channel elements, said bottom element conforming to the contour of the under-face of the bottom tank of said core and in permanent abutment therewith, a spring-like suspension, said suspension being supported at its ends on a vehicle chassis, and means rigidly securing the central portion of said bottom element to the central portion of said suspension.

4. In a radiator structure, radiator core supporting means comprising channel elements, said elements being permanently joined throughout their length to the vertical edges of a core, a bottom element connecting said channel elements, said bottom element being in abutment with and permanently joined to the entire under face of the bottom tank of said core, a spring-like suspension, said suspension having end support on a vehicle chassis, means rigidly securing the central portion of said bottom element to the central portion of said suspension, and further means joined to said channel elements, said further means being adapted to engage and support a core shell in spaced relationship with said core.

FRED L. FOSTER.